Inventor:
Rudolf Hepp
Mestern, Ross & Mestern

United States Patent Office 3,176,976
Patented Apr. 6, 1965

3,176,976
METHOD AND APPARATUS FOR SPREADING FOLDED LEAVES OF A SIGNATURE
Rudolf Hepp, Schmidt-Ott-Strasse 7a, Berlin-Steglitz, Germany
Filed Dec. 17, 1962, Ser. No. 244,975
7 Claims. (Cl. 270—54)

Devices are known which serve the purpose of opening folded printed sheets or signatures and the like, and laying them in a spread condition upon an element of inverted V configuration forming a collecting path for the purpose of further processing, such as the production of book blocks, the gathering of signatures, stitching, pasting, trimming and similar work. These devices are generally so constructed that the printed signature is fed, with the edges to be spread foremost to rollers having built-in opening devices. By means of these devices (e.g. controlled suction devices and the like), these rollers grip the foremost edges of the signature and spread them out by turning on opposite directions, whereby the opened signature, with spread leaves, drops onto or over an inverted-V conveyor member.

In other devices, signatures which are open on three sides and which have previously been folded eccentrically, so that a projecting edge or "overhang" is formed, are seized at this overhang by controlled grippers or gripper pockets which are disposed on a rotating roller. In other devices the other half of the signature is thereupon also gripped, after the signature has been transported by the gripper tool for the first half of the signature, to the gripper tool of the second half of the signature.

It is the principal object of the present invention to provide a method of and an apparatus for unfolding signatures and folded sheets whereby these earlier techniques are improved upon. The essential feature of this invention is to enable the second or rearward portion of the signature, during transport from the moment of the gripping of the forward portion of the signature until the gripping of the second half of the signature, to be so supported or guided by such means that paper stressing or flexing occurs to swing one of the leaves of the printed signature away from the other and thus permit the dependable action of the opening members even at high working speeds.

The invention will be explained more fully below with reference to the accompanying drawings, in which.

Figure 1:
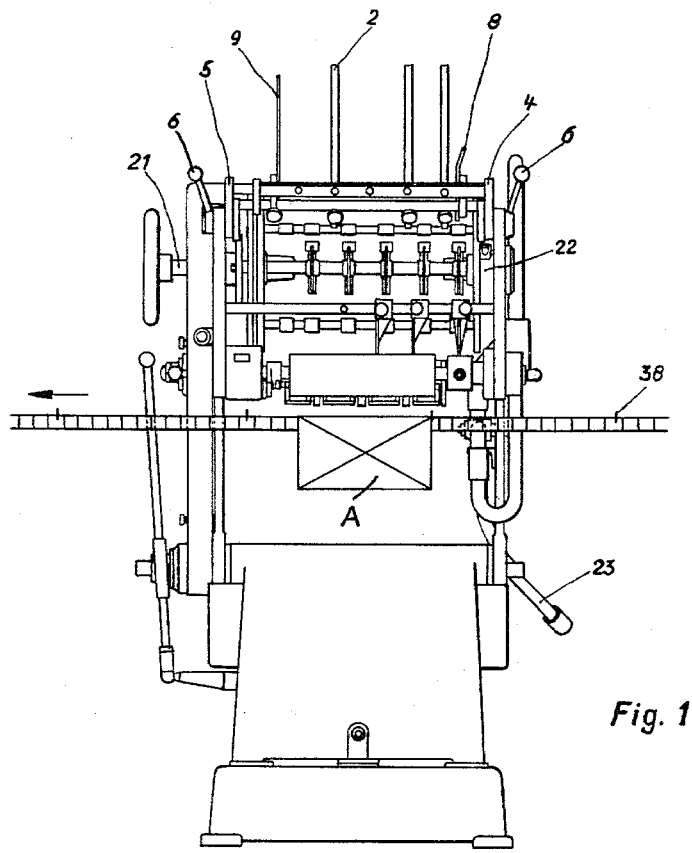
FIG. 1 is a front-elevational view of a device for spreading and laying printed signatures upon an inverted-V conveyer means.
Figure 2:
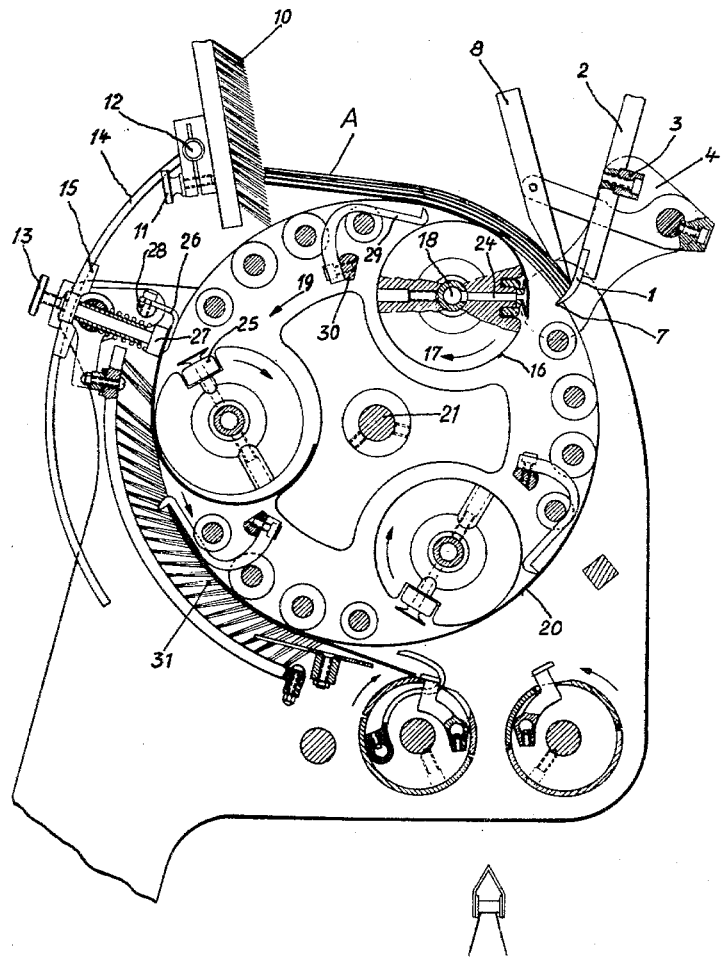
FIG. 2 is a transverse cross-sectional view of this device.

The signatures A to be processed are inserted by hand into a stacking basket (FIG. 2), the folded edges being supported against the tongues 1, various forms of which are interchangeable and which are embedded in the stack arms 2. These stack arms 2 rest on a stay 3, which in turn is fastened on the lateral flanges 4 and 5 (FIG. 1). These lateral flanges can be rocked about the fulcrum 7 with the aid of adjusting handles 6. The stack is limited laterally by stops 8 and 9 (FIG. 2). The stack of signatures also rests against a brush 10 which in turn is journaled so as to be angularly adjustable about the axis 12 with the aid of the adjusting screw 11. This brush 10 is slidable with its support bow 14 in the arcuate guide 15 against the force of a tensioning spring 13.

With the aid of this device the feed basket can be equipped for the different signature sizes. By inserting different forms of tongues 1 and by adjusting the slope of the stack arms 2 about the fulcrum 7, the lowering of the stack can be adapted to the successive removals of the lowermost sheet.

The individual signatures are removed from the bottom of the stack by means of suction disks 16 of the signature-displacing drum which rotates in the clockwise sense 17 about the axle 18, while the disks are carried in the main direction of rotation 19 which is achieved through the rotation of the side discs of the drum 20 about the axis 21 of the signature-displacing drum. Each axle 18 contains a vacuum passage to which suction is supplied from the outside through a cap 22 (FIG. 1) by way of the hose 23. This vacuum acts through the passage 24 in the suction disks 16 through exchangeable suckers 25 against the signature to be taken off at the moment when the said suction body passes under the mirror at the tongue 1. Concurrently the timing of the commencement of the suction and also the termination of the suction operation are controlled by the vacuum cap 22, after the swinging gripper 26 has gripped the signature, in order to press it against the spring plunger 27. This gripper 26 is rocked about the axis 28 and controlled in a known manner so that it opens again as soon as the ejector 29 approaches the folded edge of the signature, which is clamped fast between the gripper 26 and the plunger 27. This ejector swings about the respective axis 30. It is also controlled by known means in such a manner that it swings back on passing beneath the stack, thereupon extending into the path of the signature, stripping off the signature from the plunger 27, pushing it past the brush 31, and transferring it to the opener members 32–36 (FIGS. 6 to 12).

Figure 3:
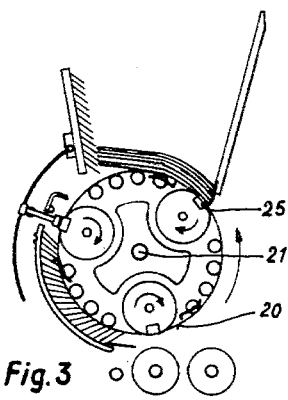
FIGS. 3, 4 and 5 show diagrammatically but in similar sectional views the various working positions of these devices.
Figure 4:
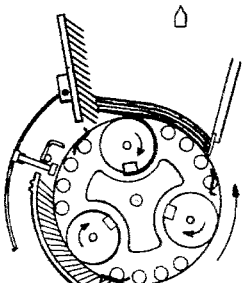
Figure 5:
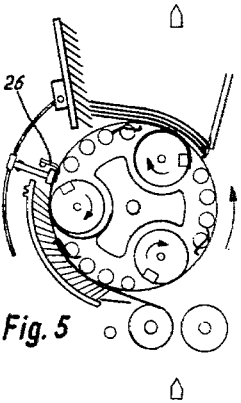

FIGS. 3, 4 and 5 show the various working positions on the rotation of the drum 20 around the axis 21. In FIG. 3 the sucker 25 grips the signature at its folded edge and rolls the signature over in accordance with FIG. 4 until it is seized by the gripper 26 as shown in FIG. 5.

Figure 9:
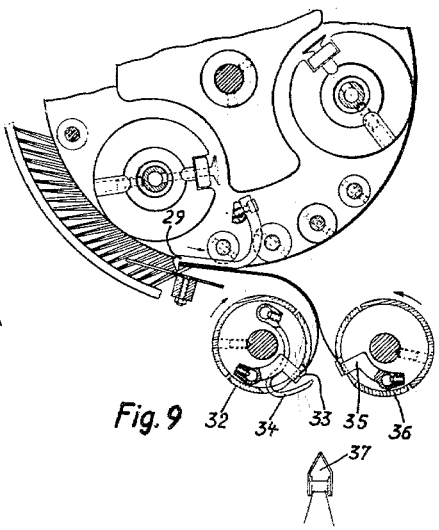
Figure 10:
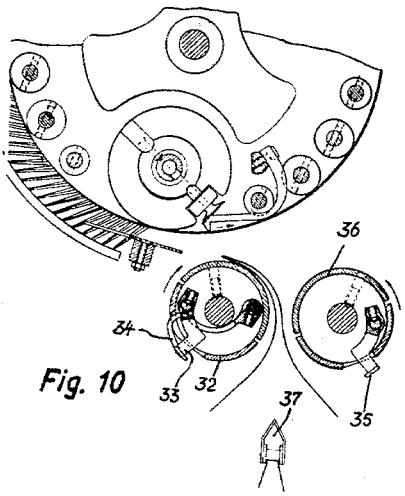
Figure 11:
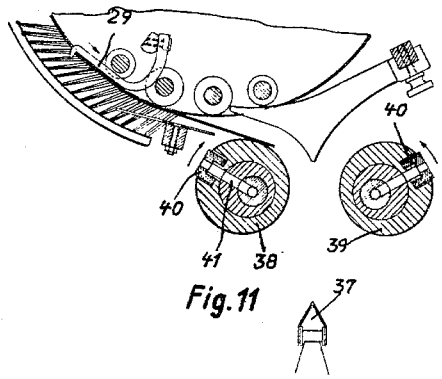
FIGS. 11 and 12 are views similar to FIGS. 6–10 illustrating the use of suction members.
Figure 12:
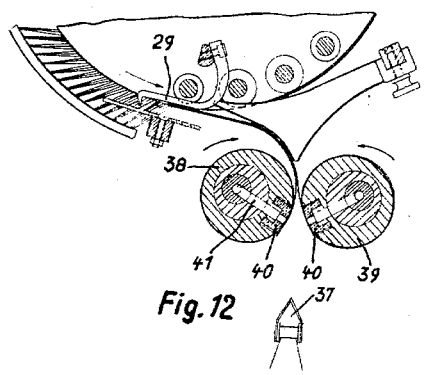

For the opening of the signature the opening members 32–36 can act with the aid of grippers 33 on an overhang, which is produced by folding the signature eccentrically, as shown in various working positions in FIGS. 6, 7, 8, 9 and 10. If on the other hand the signature is folded centrally, that is to say if there is no overhang, the leaves of the signature can be spread with the aid of a suction device 40 as illustrated in FIGS. 11 and 12.

Figure 6:
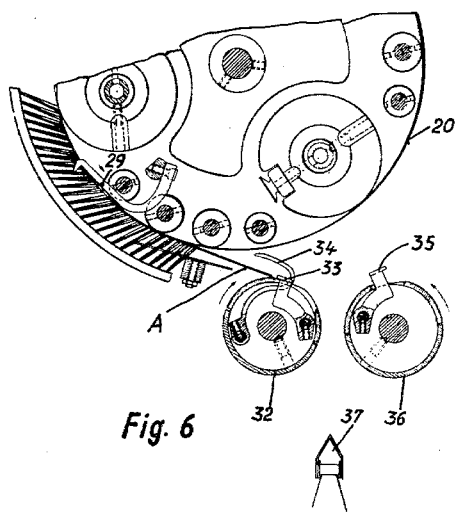
FIGS. 6, 7, 8, 9 and 10 show diagrammatically in section the working operation for the opening of signatures and laying the same over the inverted-V conveyer means, using gripper members according to the present invention.
Figure 7:
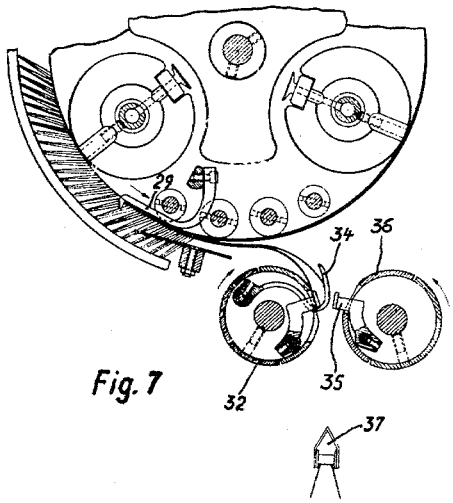

FIG. 6 shows that the signature is fed by the ejector 29 during the rotation of the drum 20 (i.e. the signature-displacing means) to an opening roller 32 of the first entraining means which turns in the direction of the arrow (clockwise) and seizes the overhang of the signature by means of a swinging gripper 33. This swinging gripper is controlled in a known manner so that it closes at the moment when the front edge of the signature has run into the still open gripper. It opens again (FIG. 10) as soon as the leaf has been spread out. On the rotation of the opener roller 32, which has a lower peripheral speed than the ejector 29, the signature is transversely flexed (FIG. 7) by the more rapid feeding action of ejector 29 whereby the portion of the signature which is not gripped is bent out under compression stress against the supporting member or abutment means 34, constituting a hook-shaped formation. This supporting member 34 has the purpose of so guiding the spreading-out portion of the signature that it is brought to the opener roller 36 of the second entraining means in order that the gripper device 35 may seize it securely, the opener roller 36 rotating with the same peripheral speed as the opener roller 32.

Figure 8:
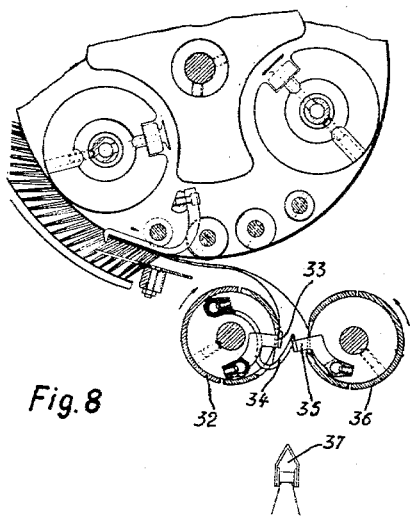

The supporting lever 34 is so controlled that it gradually frees the signature when the foremost edge of the signature springs against the gripper roller 36 (FIG. 8), being supported there before the gripper 35 grips the edge of the signature. The operation is substantially assisted by the additional paper tension in the signature. The swinging gripper 35 is also controlled in a known manner so that it commences to close as soon as the second half of the signature strikes against the opener roller 36 (FIG. 8). It opens again when the signature has been spread out (FIG. 10).

Through the increasing paper stress imparted to the signature through the above-mentioned different peripheral speeds, the rearward portion (in the direction of signature displacement) is supported against the opener roller 36 while the swinging gripper 35 grips and transports it (FIG. 8 and FIG. 9). The signature, with the leaves thus spread out, then falls (FIG. 10) over a conveyer chain 37 which by means of drivers 38 (FIG. 1) transports the signature in the open state.

This device for spreading out signatures having a projecting edge on which the opening tools act according to the invention, can be combined with a device for spreading out signatures in which there is no projecting edge, namely with the aid of rotating suckers. In FIG. 11 the peripheral speed of the opening rollers 38 and 39 is so adjusted that it is higher than the peripheral speed of the ejector 29. The signature is here fed to the suckers 40 to which suction is applied through a passage 41. When the signature has been delivered by the ejector 29 to such an extent that its front edge is situated between the opening rollers 38 and 39, the vacuum is rendered effective and the leaf is spread out by the rotation of the opening rollers. Through the increased peripheral speed the back of the signature is simultaneously drawn off the ejector 29. As soon as the signature has been sufficiently opened (FIG. 12), the vacuum is terminated by known means and the leaf drops onto the roof-shaped conveyor path 37. This conveyor path (FIG. 1) serves to feed that open leaf to other processing devices for the purpose of producing book blocks, the gathering leaves, for trimming leaves, gluing, stitching, and so on.

Through the provision of a corresponding variation of speed of the opening rollers 32, 36 and 38, 39 respectively, it is possible with the aid of a change-speed gear to use the above-described device at choice for both methods of working described here. If a control device for these speed variations is provided, this combination device will process a stack A consisting of signatures folded eccentrically, that is to say having a projecting paper edge, and also simultaneously signatures which are folded centrally, that is to say which have a side-folded edge in the usual way. For the processing of a stack of signatures in which the sheets are mixed in this manner it is necessary for the sequence of the processing of the differently folded signatures and hence the sequence of utilization of the opening device necessary therefor, or the corresponding position of the change-speed gear to be transmitted to a control device serving the purpose of initating the control impulses continuously required.

What I claim is:

1. A method of spreading juxtaposed flexible leaves of a signature having a folding edge, comprising the steps of:
    (a) displacing said signature in a direction transverse to said folding edge with said folding edge rearwardly and with leading edges of said leaves forwardly in the direction of displacement of said signature;
    (b) gripping a forward portion of one of said leaves and entraining it with a relatively low speed while pushing a rearward portion of said signature forwardly at a relatively high speed to flex at least said one of said leaves of said signature transversely of the direction of movement of said forward portions and swing the leading edge of the other of said leaves away from the leading edge of said one of said leaves;
    (c) entraining a forward portion of said other leaf generally in said direction upon the swinging of its leading edge away from the leading edge of said one leaf, thereby spreading said leaves while continuing the displacement of said signature; and
    (d) releasing said leaves in a spread condition of said signature.

2. A method as defined in claim 1 wherein said signature is deposited upon an inverted-V formation for maintaining the spread of said leaves.

3. A method as defined in claim 1 wherein said forward portion of said one of said leaves is entrained during step (b) in a direction generally transversely to the direction of displacement of said signature during step (a).

4. A method as defined in claim 3 wherein said forward portions are entrained by suction during steps (b) and (c).

5. An apparatus for spreading juxtaposed flexible leaves of a signature having a folding edge, comprising:
    a signature-displacing means engageable with a signature for shifting it along a transport path in a direction transverse to said folding edge with said folding edge rearwardly and with leading edges of said leaves forwardly in the direction of displacement of said signature;
    first entraining means forwardly of said signature-displacing means along said transport path and engageable with a forward portion of at least one of said leaves while a rearward portion of said signature is engaged by said signature-displacing means, said first entraining means displacing said forward portion of said one of said leaves at a speed less than that of said rearward portion whereby at least said one of said leaves of said signature is transversely flexed and the other of said leaves being swung away from said one of said leaves; and
    second entraining means disposed adjacent said first entraining means and engageable with a forward portion of said other leaf upon the swinging thereof away from said one of said leaves for spreading said leaves.

6. An apparatus as defined in claim 5 wherein said signature-displacing means includes a drum rotatable about an axis and provided with at least one peripheral formation engageable with said folding edge for displacing said signature upon the periphery of said drum, said first entraining means including a roller rotated with a peripheral speed less than that of said drum and having engaging means upon its periphery including a hook-shaped formation protruding therefrom for seizing the leading edge of said one of said leaves and displacing said edge substantially transversely of the axis of rotation of said roller, said axis of rotation extending parallel to said axis of said drum and said roller being rotated in a sense opposite the sense of rotation of said drum.

7. An apparatus as defined in claim 6 wherein said second entraining means includes another roller juxtaposed with the first-mentioned roller and having an axis parallel to the axis of said first roller, said other roller being rotatable in a sense opposite the sense of rotation of said first roller, said other roller being provided with respective engaging means upon its periphery for seizing the leading edge of said other leaf and displacing said edge substantially transversely of said axis of said other roller and in a sense opposite said leading edge of said one of said leaves.

References Cited by the Examiner
UNITED STATES PATENTS

| | | | |
|---|---|---|---|
| 2,413,358 | 12/46 | Kleineberg | 270—54 |
| 2,845,264 | 7/58 | Faeber | 270—54 |
| 2,855,195 | 10/58 | Young | 270—54 |
| 2,903,260 | 9/59 | Faeber | 270—54 |
| 3,089,693 | 5/63 | Gore et al. | 270—54 |

EUGENE R. CAPOZIO, *Primary Examiner.*

ROBERT E. PULFREY, WILLIAM B. PENN,
*Examiners.*